(12) United States Patent  
Greiner

(10) Patent No.: US 6,547,408 B1  
(45) Date of Patent: Apr. 15, 2003

(54) DISPLAY SCREEN WITH BACKLIGHT

(75) Inventor: Horst Greiner, Aachen (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 70 days.

(21) Appl. No.: 09/610,716

(22) Filed: Jul. 6, 2000

(30) Foreign Application Priority Data

Jul. 7, 1999 (DE) .......................................... 199 31 299

(51) Int. Cl.⁷ ................................................ F21V 7/04
(52) U.S. Cl. ............................ 362/31; 362/26; 385/146
(58) Field of Search ................................ 362/261, 271, 362/31; 385/146

(56) References Cited

U.S. PATENT DOCUMENTS

| | | | |
|---|---|---|---|
| 5,349,503 A | * | 9/1994 | Blonder et al. ................ 362/31 |
| 5,997,148 A | * | 12/1999 | Ohkawa ...................... 362/31 |
| 6,011,602 A | * | 1/2000 | Miyashita et al. ......... 362/31 X |
| 6,079,838 A | * | 6/2000 | Parker et al. ................... 362/26 |

FOREIGN PATENT DOCUMENTS

EP        0590511 A1      4/1994      ........... G92F/1/335

OTHER PUBLICATIONS

Patent Abstracts of Japan, Publication No. 08248232A, Date of Publication Sep. 27, 1996, Title: Surface Light Emitting Device and its Production.

* cited by examiner

*Primary Examiner*—Stephen Husar

(57) ABSTRACT

The invention describes a display screen (1) with a backlight, comprising at least a light source (4) and an optical guide plate (2). The homogeneity of the light distribution is achieved by scattering the light rays on reflective indentations (10) in the side faces (9) of the optical guide plate (2) and/or by recesses (11) having vertical walls perpendicular to the front face (7) and/or the back face (8) of the optical guide plate (2). The recesses (11) with vertical walls also improve the coupling-out of the light to the backlight of the display screen (1).

9 Claims, 3 Drawing Sheets

DISPLAY SCREEN WITH BACKLIGHT

BACKGROUND OF THE INVENTION

The invention relates to a display screen, particularly a liquid crystal display screen, with a backlight, comprising at least a light source and an optical guide plate having a front face facing the display screen, a back face and side faces. The invention also relates to an optical guide plate having a front face, a back face and side faces.

Liquid crystal display screens are passive display systems, i.e. they do not emit light themselves. These display screens are based on the principle that light passes or does not pass the layer of liquid crystals. This means that an external light source is required so as to generate an image. In reflective liquid crystal display screens, the ambient light is used as an external light source. In transmissive liquid crystal display screens, artificial light is generated in a backlight system.

A backlight system comprises a light source which supplies light for background illumination, and an optical guide plate having a front face, a back face and a plurality of side faces. One side face of the optical guide plate, which is adjacent to the light source, receives light generated by this source so as to guide it as background illumination to the liquid crystal display screen. Further components of the backlight system are a reflection layer which reflects light exiting from the back face back into the optical guide plate, and light-scattering elements which are present inside the optical guide plate.

When a light ray emitted by the light source enters the optical guide plate, it normally travels in the longitudinal direction of the light source and does this on the basis of repetitive, internal total reflection on the front and back face. Then the light ray is incident on the scattering material, the condition for an internal total reflection is not met and the path in the longitudinal direction is interrupted. A part of the light is scattered to the liquid crystal display screen so as to ensure its background illumination.

Different principles are used for light scattering. For example, an optical guide plate having notches in the front and/or back face is known from EP 0 590 511 A1. For example, an optical guide plate comprising air bubbles of a given size is described in patent abstracts of Japan, publication no. 08248232A.

In practice, it has proved to be difficult to determine the spatial arrangement of these scattering structures in such a way that a possibly homogeneous luminance occurs in the plane of the front face. This particularly applies when using more or less punctiform light sources such as, for example, light-emitting diodes. To achieve a homogeneous distribution, a plurality of light-emitting diodes must be used.

BRIEF SUMMARY OF THE INVENTION

It is an object of the invention to provide a backlight system for display screens with an improved homogeneity of the light distribution.

This object is solved by a display screen with a backlight, comprising at least a light source and an optical guide plate having a front face facing the display screen, a back face and side faces, and is characterized in that, for reflection of a light ray emitted by the light source with respect to its vertical components and for diffuse scattering with respect to its other components, the optical guide plate has reflective indentations in at least one side face and/or recesses having vertical walls.

As a consequence of the indentations in the side faces, or the recesses in the optical guide plate, light rays are randomly distributed in the xy plane of the optical guide plate, while the z component is maintained during reflection. The incident light is therefore uniformly spread across the optical guide plate.

It is preferred to provide the reflective indentations regularly and along all side faces.

Since the reflection on the side faces of the optical guide plate does not violate the condition for the total reflection of the front and the back face, the light can be effectively spread across the optical guide plate by reflection on the edges of the optical guide plate.

It may be preferred to provide the recesses perpendicularly to the front and/or back face.

The recesses having vertical walls also improve the homogeneity of the light distribution in the optical guide plate. When a light ray is incident on the wall of such a recess, it is totally reflected either on the lateral face or the upper boundary of the recess, or it is refracted into the recess. After the light ray has been refracted into the recess, it can leave this recess through the perpendicular lateral face, while the z component of the light ray is maintained and the xy direction is changed due to refraction. The light is homogeneously spread across the xy plane of the optical guide plate.

It is also preferred that the recesses penetrate the optical guide plate completely or partly.

By means of the recesses, the light can be better coupled out into the direction of the display screen. When a light ray is incident on the wall of such a recess, it is totally reflected either on the lateral face or the upper boundary of the recess, or it is refracted into the recess. When the light ray exits through the upper or lower boundary of the recess, the light ray is generally scattered out of the optical guide plate. The magnitude of this effect and the angle distribution of the coupled-out light are directly dependent on the ratio between the height of the recess and its cross-section and can thus be well controlled.

It may be preferred that scattering elements are present on the bottoms of the recesses.

An additional distribution of the light rays can be achieved by means of the scattering elements. When a light ray laterally enters a recess through the perpendicular lateral face, and when it is incident on a scattering element, it can be scattered in such a way that it exits through the upper opening of the recess or reaches the optical guide plate again through the perpendicular lateral face of the recess. In the latter case, the light rays are spread across the xy plane of the optical guide plate, while the condition for a total reflection on the front face and the back face of the optical guide plate is maintained.

The invention also relates to an optical guide plate having a front face, a back face and side faces, having reflective indentations in at least one side face and/or recesses having vertical walls.

Due to the reflective indentations in at least one side face and/or the recesses with vertical walls, incident light rays are reflected with respect to the vertical component of the optical guide plate and diffusely scattered with respect to the other components of the optical guide plate. The light rays are spread across the xy plane of the optical guide plate, ensuring a homogeneous distribution of the light.

These and other aspects of the invention are apparent from and will be elucidated with reference to the embodiments described hereinafter.

DETAILED DESCRIPTION OF THE INVENTION

Figure 1:
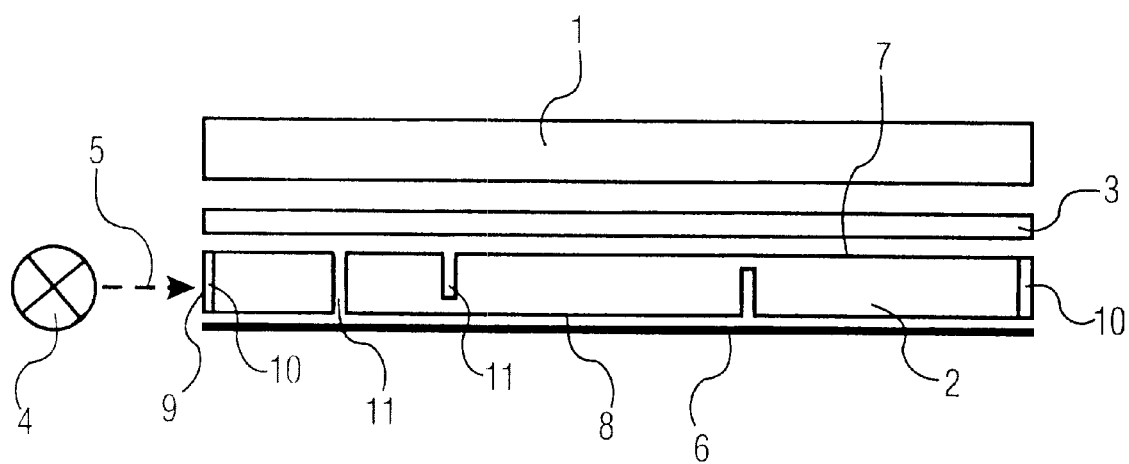
FIG. 1 is a vertical cross-section of a display screen with a backlight system.

FIG. 1 shows a display screen 1, for example, a liquid crystal display screen, with a backlight system. The backlight system comprises a light source 4, for example, a light-emitting diode or a cold cathode lamp, and an optical guide plate 2 made of a transparent synthetic material such as, for example, polymethyl methacrylate. The optical guide plate 2 has a front face 7 facing the display screen 1, a back face 8 and a plurality of side faces 9. The light rays 5 emitted by the light source 4 reach the optical guide plate 2 via a side face 9, adjacent to the light source 4. The side faces 9 of the optical guide plate 2 have reflective indentations 10 of arbitrary height, diameter and cross-section, for example, the cross-section of a sector of a circle. Moreover, recesses 11 having vertical side walls are provided in the optical guide plate 2 perpendicularly to the front face 7 and/or the back face 8. These recesses 11 are made, for example, by means of punching and may penetrate the optical guide plate 2 completely or only partly. A diffusion layer 3 is present between the display screen 1 and the optical guide plate 2. A reflection layer 6 is provided behind the back face 8.

Alternatively, scattering elements may be provided on the bottoms of recesses which do not completely penetrate the optical guide plate. These scattering elements may be, for example, transparent, non-absorbing pellets which have a diameter of up to 100 μm and are made of a transparent synthetic material such as, for example, polymethyl methacrylate. In recesses which penetrate the optical guide plate completely, the reflection layer 6 may additionally have scattering properties at least in the area of the recesses.

When using a cold cathode lamp as a light source 4, the light source 4 may additionally be provided with a reflecting shield.

Figure 2:
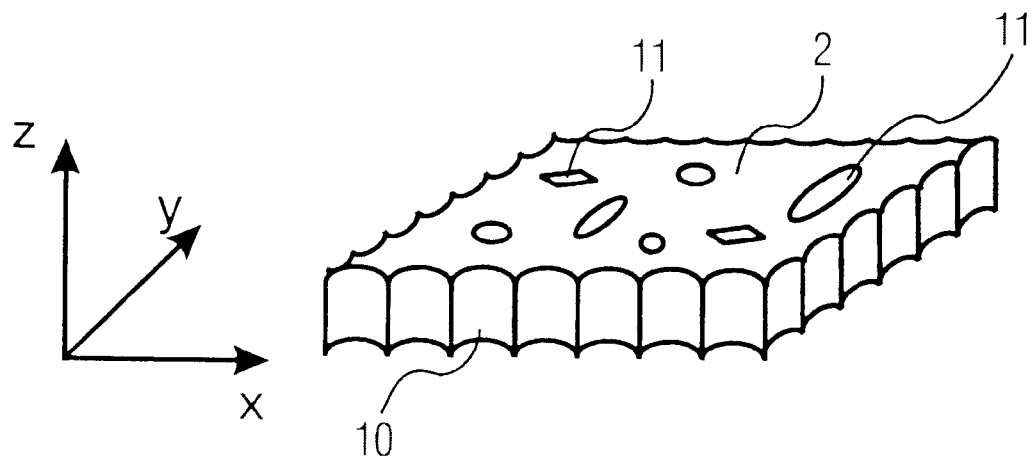
FIG. 2 is a plan view of an optical guide plate with indentations on the side faces as well as recesses perpendicular to the front and the back face.

FIG. 2 shows an optical guide plate 2 having indentations 10 on the side faces 9 of the optical guide plate 2, as well as recesses 11 perpendicular to the front face and back face of the optical guide plate 2. The reflective indentations 10 are formed in this embodiment in such a way that they correspond to a vertical corrugation of the side faces 9. The recesses 11 with vertical walls may have, for example, a circular, an elliptic, a diamond-shaped or a rectangular cross-section and an arbitrary diameter.

Figure 3:
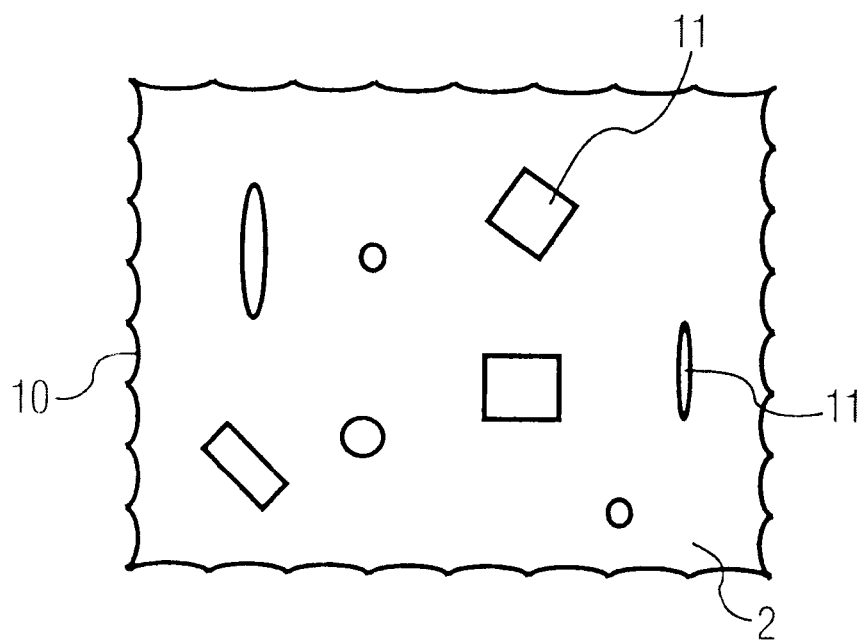
FIG. 3 is a horizontal cross-section of an optical guide plate with indentations on the side faces and recesses perpendicular to the front and the back face.
Figure 4:
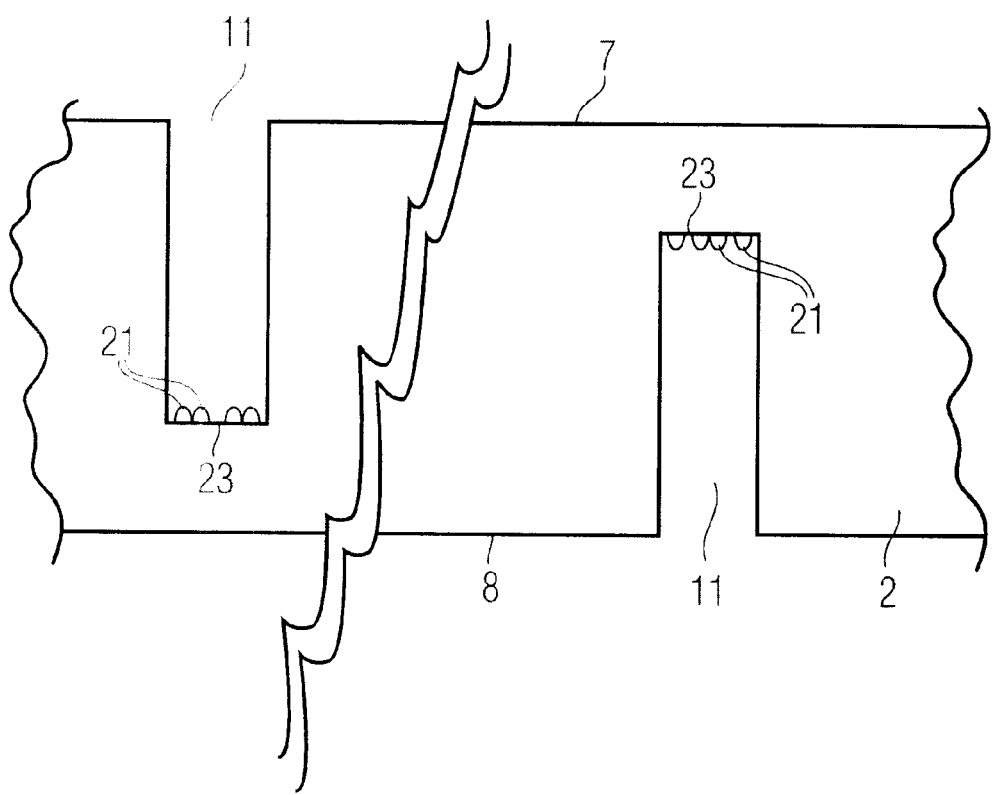
FIG. 4 is an enlarged view of part of the vertical cross-secton of FIG. 1.

FIG. 3 is a vertical cross-section of an optical guide plate 2 having reflective indentations 10 on the side faces 9 of the optical guide plate 2, as well as recesses 11 with vertical side walls perpendicular to the front and the back face of the optical guide plate 2.

As is shown clearly in FIGS. 2 and 3, the recesses 11 are irregularly arranged in two respects: they are irregularly spaced in both the x and y directions, which are orthogonal and parallel to the front face; and as described above are of different sizes and shapes in cross section. Further, the recesses 11 which extend only partly through the guide plate 2 have scattering elements 21, such as the pellets described above, shown diagrammatically only on the bottoms 23 of the respective recesses.

Alternatively, the optical guide plate 2 may be formed only with reflective indentations 10 in the side faces 9 of the optical guide plate 2 or only with recesses 11 perpendicular to the front face 7 and/or the back face 8 with vertical walls.

The background illumination of a display screen 1 is effected as follows. A light ray 5 emitted by the light source 4 enters the optical guide plate 2 via a side face 9 and, because of repetitive total reflection on the front face 7 and the back face 8, travels in the longitudinal direction of the light source 4. When the light ray 5 is incident on a reflective indentation 10 on a side face 9 of the optical guide plate 2, the light ray 5 is arbitrarily scattered as regards the xy plane of the optical guide plate 2, whereas the vertical component is maintained. When a light ray 5 is incident on the wall of a recess 11, it is totally reflected either on the lateral face or the upper boundary of the recess 11, or it is refracted into the recess 11. When the light ray 5 leaves a recess 11 through the perpendicular lateral face, the z component of the light ray 5 is maintained, whereas the xy direction is changed due to refraction. When the light ray 5 enters and exits the upper or lower boundary of the recess 11, the light ray 5 is generally scattered out of the optical guide plate 2. Backwardly exiting light is then reflected back again into the optical guide plate 2 through the reflection layer 6.

When scattering elements are provided on the bottoms of recesses 11 which do not completely penetrate the optical guide plate 2, a light ray 5 laterally entering a recess 11 through the perpendicular lateral face is scattered upon incidence on a scattering element, such that it reaches the optical guide plate 2 again through the perpendicular lateral face of the recess 11 or exits through the upper opening of the recess 11.

When the reflection layer 6 has reflecting and scattering properties in the area of recesses 11 completely penetrating the optical guide plate 2, a light ray 5 exiting backwards is deflected in such a way that it reaches the optical guide plate 2 again or exits through the upper opening of the recess 11.

The light for background illumination of the display screen 1 may also be coupled out by a structure, for example, impressed dots of a white color or by suitable indentations and surface structures of the front face 7 or the back face 8.

To ensure the background illumination of the display screen 1, the light rays 5 which have been coupled out finally reach this display screen through the diffusion layer 3.

What is claimed is:

1. A display screen (1) with a backlight, comprising at least a light source (4) and an optical guide plate (2) having a front face (7) facing the display screen (1), a back face (8) and side faces (9), characterized in that, for reflection of a light ray (5) emitted by the light source (4) with respect to its vertical component and for diffuse scattering with respect to its other components, the optical guide plate (2) has irregularly arranged recesses (11), said irregularly arranged recesses penetrate the guide plate (2) at least partly and have bottoms 23 and vertical walls, and the guide plate further comprises scattering elements 21 present on the bottoms of the recesses (11) only.

2. An optical guide plate (2) having a front face (7), a back face (8) and side faces (9), characterized in that the optical guide plate (2) has irregularly arranged recesses (11) having vertical walls, at least one of said irregularly arranged recesses (11) extends partly from said front face to a respective bottom surface, and at least another one of said irregularly arranged recesses (11) extends partly from said back face to a respective bottom surface, and the recesses have bottoms (23), and the screen further comprises scattering elements (21) present on the respective bottoms of said at least one and said at least another one of recesses (11) only.

3. An optical guide plate (2) as claimed in claim 2, characterized in that at least a further one of said irregularly arranged recesses (11) extends from said front face through to said back face.

4. An optical guide plate (2) as claimed in claim 2, characterized in that a plurality of said irregularly arranged recesses (11) have respectively different ones of a plurality of cross sectional shapes.

5. A display screen (1) with a backlight, comprising at least a light source (4) and an optical guide plate (2) having a front face (7) facing the display screen (1), a back face (8) and side faces (9), characterized in that, for reflection of a light ray (5) emitted by the light source (4) with respect to its vertical component and for diffuse scattering with respect to its other components, the optical guide plate (2) has irregularly arranged recesses (11) having vertical walls, a plurality of said irregularly arranged recesses (11) have respectively different ones of a plurality of cross sectional shapes, and said irregularly arranged recesses have bottoms (23), and the screen further comprises scattering elements (21) present on the respective bottoms of the recesses (11) only.

6. A display screen (1) with a backlight as claimed in claim 5, characterized in that at least one of said irregularly arranged recesses (11) extends partly from said front face to a respective bottom surface (23), and at least another one of said irregularly arranged recesses (11) extends partly from said back face to a respective bottom surface (23), and the screen further comprises scattering elements (21) present on the bottoms (23) of the at least one and the at least another one of said recesses (11) only.

7. A display screen (1) with a backlight as claimed in claim 6, characterized in that at least a further one of said irregularly arranged recesses (11) extends from said front face through to said back face.

8. A display screen (1) with a backlight as claimed in claim 6, characterized in that a plurality of said irregularly arranged recesses (11) have respectively different ones of a plurality of cross sectional shapes.

9. An optical guide plate (2) having a front face (7), a back face (8) and side faces (9), characterized in that the optical guide plate (2) has irregularly arranged recesses (11), said recesses penetrate the optical guide plate at least partly and have bottoms (23) and vertical walls, and the guide plate further comprises scattering elements 21 present on the bottoms of the recesses (11) only.

* * * * *